United States Patent [19]
Jacobs et al.

[11] 3,960,528
[45] June 1, 1976

[54] MUFFLER PARTICULATE TRAP FOR INTERNAL COMBUSTION ENGINES

[75] Inventors: Emmett Smith Jacobs, Wilmington, Del.; Vincent Edward Liberi, Newark, Md.

[73] Assignee: E. I. Du Pont de Nemours and Company, Wilmington, Del.

[22] Filed: Feb. 25, 1975

[21] Appl. No.: 552,866

Related U.S. Application Data

[63] Continuation-in-part of Ser. No. 339,127, March 8, 1973, abandoned.

[52] U.S. Cl. .................................... 55/346; 55/424; 55/457; 55/459 R; 55/484; 55/522; 55/DIG. 25; 55/DIG. 30; 60/311
[51] Int. Cl.² ........................................ B01D 45/12
[58] Field of Search ............ 55/276, 321, 347, 346, 55/424, 512, DIG. 25, DIG. 30, 447, 457, 459 R, 484, 522; 60/311

[56] References Cited
UNITED STATES PATENTS

| | | | |
|---|---|---|---|
| 3,397,034 | 8/1968 | Tulleners et al. | 55/DIG. 30 |
| 3,485,593 | 12/1969 | Lenane et al. | 55/DIG. 30 |
| 3,815,337 | 6/1974 | Lenane | 55/276 |
| 3,822,531 | 7/1974 | Wisnewski et al. | 55/424 X |

*Primary Examiner*—Frank W. Lutter
*Assistant Examiner*—Kathleen J. Prunner
*Attorney, Agent, or Firm*—James A. Costello

[57] ABSTRACT

A muffler particulate trap for an internal combustion engine comprising a housing adapted to be connected to the exhaust stream of the engine through an inlet port, said housing also having an outlet port for communication with the atmosphere, between the inlet port and outlet port, in serial arrangement in the housing, there is at least one chamber containing refractory alumina of requisite high porosity and high surface area and, in communication with said chamber(s), at least one cyclone separator that vents the exhaust stream through said housing outlet into the atmosphere.

4 Claims, 10 Drawing Figures

MUFFLER PARTICULATE TRAP FOR INTERNAL COMBUSTION ENGINES

CROSS-REFERENCE TO RELATED APPLICATION

This is a continuation-in-part application of copending application bearing U.S. Ser. No. 339,127, filed on March 8, 1973 and now abandoned.

BACKGROUND OF THE INVENTION

1. Field of the Invention

This invention concerns the control of automotive exhaust particulate emissions, particularly the removal of lead-containing particulates from the exhaust gases.

2. Description of the Prior Art

Exhaust gases of internal combustion engines normally contain small amounts of particulate materials. The particles are either carbonaceous materials from incomplete combustion of fuel or are derived from additives normally used in fuels and lubricants.

Gasolines employed as fuels for internal combustion engines for automotive use usually contain tetraalkyllead compounds such as tetraethyllead, tetramethyllead, mixed alkyl leads and the like to improve the octane rating and provide antiknock characteristics. To minimize deposition of the lead compounds in the combustion chambers, scavenging compounds such as a mixture of ethylenedibromide and ethylenedichloride are used together with the lead antiknock compounds. It is known in the art that hydrogen halides are also present in the exhaust gases. It is believed that during the combustion process relatively volatile lead halides are formed which are carried out of the combustion chambers with the exhaust gases. In the exhaust system, most of the lead halides are condensed to particulate matter. Since the conventional automotive exhaust systems are not designed to remove particulate matter, most of the particulates are exhausted into the atmosphere.

Many suggestions have been made in the art for removing particulate matter and particularly lead particles from the exhaust gas. Prior art devices employing cyclone separators, baffle systems, liquid fluxes, filters, and the like, have generally been unsuccessful in removing particulate matter for a number of reasons including insufficient removal of lead particulates, inefficient removal of small size particles, development of excessive back pressures, or insufficient durability.

In U.S. Pat. No. 3,397,034, an agglomeration zone of particulated alkaline material is provided before an inertial separator. The material in the zone, e.g. bauxite, is selected to be reactive with lead and acid compounds in the raw exhaust gas and to form agglomerates as the result of reaction between the material and compounds. Collection of agglomerated lead is accomplished concurrently with loss of the substrate reaction product upon which the lead has accumulated. Aggregates of the alkaline material reaction product having lead particles adhered thereto sluff off in relatively large pieces and collect in the subsequent solids separation zone. Exhaust gas leaving the separator is in a condition such that it does not destroy the alumina support of a catalyst downstream, which alumina is a kind otherwise destroyed by raw exhaust gas.

In U.S. Pat. No. 3,485,593, is disclosed an agglomeration unit using as agglomeration aids: marble chips, silicon carbide, iron nails, synthetic or natural zeolites, wire mesh and the like. There is no suggestion of using the agglomerating alumina disclosed herein. Rather, after exhaust gases pass through the agglomeration unit and are freed of solids, then, the gas is passed through catalyst supported on a high surface area material such as alumina. The disclosed alumina has been calcined at 700° to 800°C to drive off water and therefore not become plugged with exhaust gas solids.

U.S. Pat. No. 3,815,337 discloses an exhaust system comprising a separate agglomerating unit containing alumina interposed in an engine exhaust pipe between the engine and a muffler trap containing a cyclone-type particulate separator. The patent discloses that uncondensed compounds capable of forming fine particulates such as lead halides are absorbed, thus preventing the formation of fine particulates. It suggests that the alumina absorbent degrades resulting in release of coarse alumina particulates into the particulate separator. Thus this system, like that of U.S. Pat. No. 3,397,034, uses alumina as an expendable material during the recovery of particulates.

SUMMARY OF THE INVENTION

This invention concerns an apparatus which is an exhaust muffler particulate trap for attenuating the sound and removing solid particles from the exhaust of an internal combustion engine that is operated on fuel containing tetraalkyllead compounds and lead scavenging compounds such as ethylenedibromide and/or ethylenedichloride. The apparatus of this invention comprises:

i. an elongated housing having an inlet port for connection with the exhaust gas stream of said engine, an outlet port communicating with the atmosphere, an agglomerating chamber and an inertial cyclone separator communicating with a particulate collection chamber, said agglomerating chamber, cyclone separator and collection chamber being located within said housing;

ii. said agglomerating chamber being in communication with said inlet port and containing refractory alumina pellets having a pore volume in the range of 0.1 to 0.9 cc per gram and a surface area in the range of 50 to 700 square meters per gram, said alumina being nonreactive with the exhaust gas constituents;

iii. said cyclone separator having an inlet, a particulate outlet and a gas outlet, and being in communication with said agglomerating chamber through the cyclone separator inlet, the cyclone separator also communicating with said particulate collection chamber wherein particulates are collected and retained, communication with the collection chamber being through the particulate outlet of the cyclone separator, the cyclone separator also being in communication with the outlet port of the housing through the cyclone separator gas outlet. It should be understood that when it is said that the cyclone separator is in communication with the outlet port of the housing what is meant is that communication is direct or is made through a plenum chamber that is connected to the housing outlet.

The novel apparatus comprises a gas feed means for conducting exhaust gases into a housing containing one or more chambers each chamber filled with highly porous, high surface area refractory alumina through which the exhaust gases will travel and wherein nucleation and agglomeration of particulates will take place and, in series with these chambers, at least one inertial cyclone separator wherein the separation of suspended matter from the gas stream will take place by changing the flow direction of the gases, a collection chamber wherein the precipitated particulates are collected and retained, and an outlet from the separator for discharging the exhaust gases substantially free of particulates into the atmosphere (optionally through a plenum chamber).

Reference to "an" agglomerating chamber and to "an" inertial cyclone separator is made for simplicity, it being understood that there can be more than one such chamber and separator. It is preferred that there be one or two chambers and one or two cyclone separators in communication therewith. When more than one alumina-filled chamber is employed, the additional chambers are defined by partitions within the housing. The partitions are fabricated as will be obvious to those skilled in the art.

The alumina can be in the form of pellets, bricks, spheres, etc., which form for convenience will be referred to as pellets. The porous high surface area refractory alumina is a hard, erosion resistant, durable, dimensionally stable material that resists fusion or disintegration up to about 810°C, that has a pore volume in the range of about 0.1 to 0.9 cc per gram and a surface area in the range of about 50 to 700 square meters per gram. Pellet sizes are such that the exhaust gas can pass through without developing appreciable back pressure.

The alumina pellets contemplated herein usually will have cross-sectional dimensions of from about 1/32 to 1 inch, and preferably about ¼ inch. Preferred properties are: a surface area from about 100 to 500 sqaure meters per gram, a pore volume from about 0.2 to 0.7 cc per gram, a pore diameter from about 10 to 75 Angstroms and a crushing strength in the ¼ inch size from about 25 to 75 pounds. While the amount of alumina used in the muffler lead trap will depend upon the displacement of the engine, generally from about 5 pounds to 15 pounds will suffice for most uses.

Exhaust gases pass through the alumina in the chamber substantially freely. The refractory alumina is relatively nonreactive with exhaust gas constituents other than in providing sites for condensation, particle nucleation and agglomeration. Agglomerated particles are not permanently absorbed, adsorbed or otherwise combined with the non-alkaline refractory alumina described herein.

The terms particulates and particles are used interchangeably herein and refer to any solid material present in the exhaust gases of internal combustion engines. Such solids may be carbonaceous materials, oxides of iron, metallic lead, lead-containing compounds, and compounds of other metals. These solid materials are derived from incomplete combustion of fuels, additives present in fuels and lubricants, or from corrosion processes. Primary interest is in the removal of lead-containing solids from the exhaust gases. For convenience, the novel muffler particulate traps are sometimes referred to herein as muffler lead traps.

The muffler traps of the present invention can be sized and shaped like the conventional automotive mufflers and utilized as replacements for such mufflers or installed as original equipment. The muffler traps can have rectangular, circular, oval or other cross sections. Since the muffler traps of the invention will normally be used in place of the conventional mufflers, the shape and the size of any particular invention trap will depend upon such factors as displacement of the engine and the vehicle manufacturer's specifications.

DETAILS OF THE INVENTION

Figure 1:
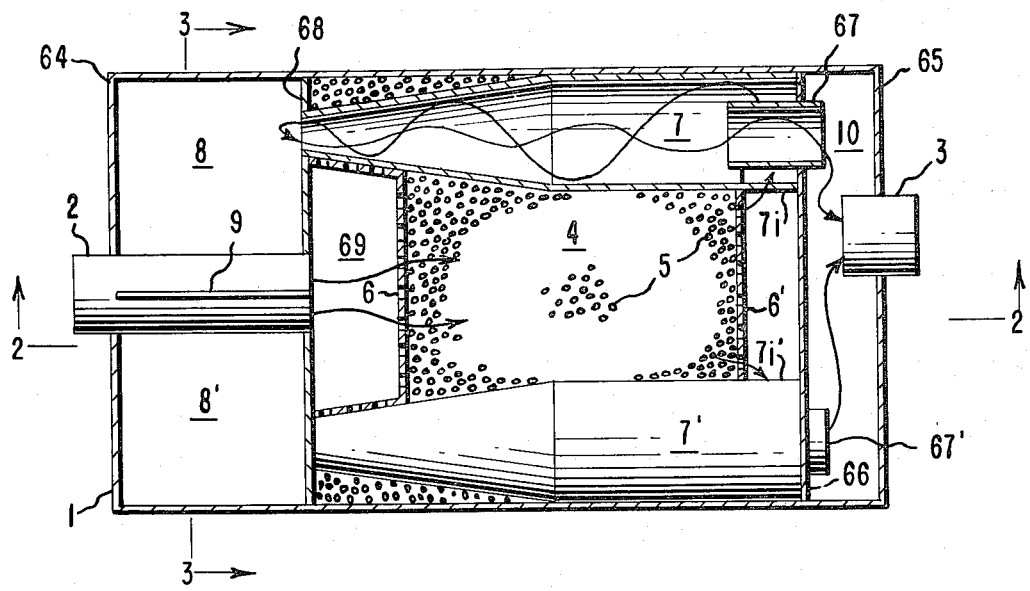
FIG. 1 represents one embodiment of the invention wherein the muffler particulate trap contains a chamber filled with highly porous, high surface area refractory alumina with two cyclone separators and two collection chambers. One cyclone separator shown in FIG. 1 is a cross-sectional view through line 4—4 of FIG. 2.
Figure 2:
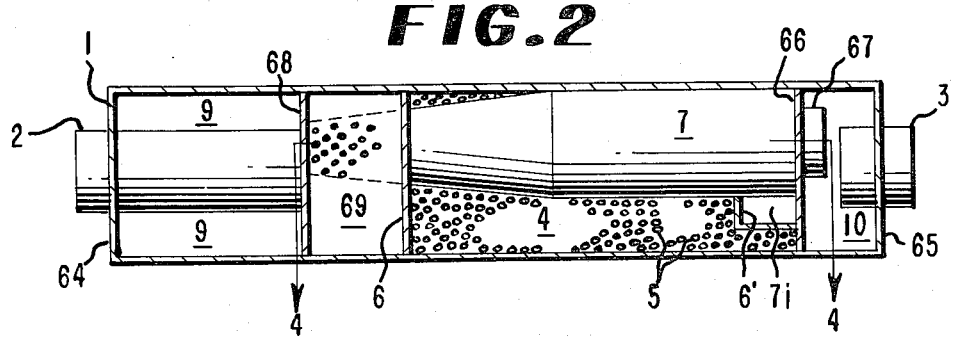
FIG. 2 is a cross-sectional view of the muffler particulate trap shown in FIG. 1 through 2—2.
Figure 3:
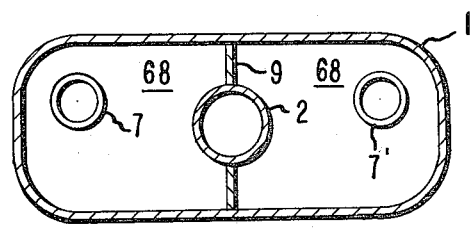
FIG. 3 is another cross-sectional view of said muffler particulate trap through 3—3.

In FIG. 1, the muffler particulate trap comprises housing 1 with trap inlet 2 and trap outlet 3 supported by ends 64 and 65 respectively. Baffle 66 supports cyclones 7 and 7' and has cyclone outlets 67 and 67' projecting through it. Baffle 68 supports cyclones 7 and 7' and allows communication through it between cyclone 7 and solids collection chamber 8 and between cyclone 7' and solids collection chamber 8', as well as between inlet 2 and inlet plenum 69. Plenum 69 is bounded by housing 1, baffle 68 and perforated or sieve-like wall 6. Agglomerant chamber 4 is bounded by housing 1, baffles 66 and 68, cyclones 7 and 7' and perforated walls 6 and 6'. Wall 6' encloses tangential inlets 7i and 7i' for cyclones 7 and 7'. Bed 5 of refractory alumina pellets fills chamber 4.

Cyclone outlets 67 and 67' are tubes which project inside cyclones 7 and 7' to points just beyond inlet 7i and 7i'. They provide communication between cyclones 7 and 7' and plenum chamber 10. Partition 9 separates solids collection chambers 8 and 8', which are closed except for openings in the ends of cyclones 7 and 7'.

Figure 4:
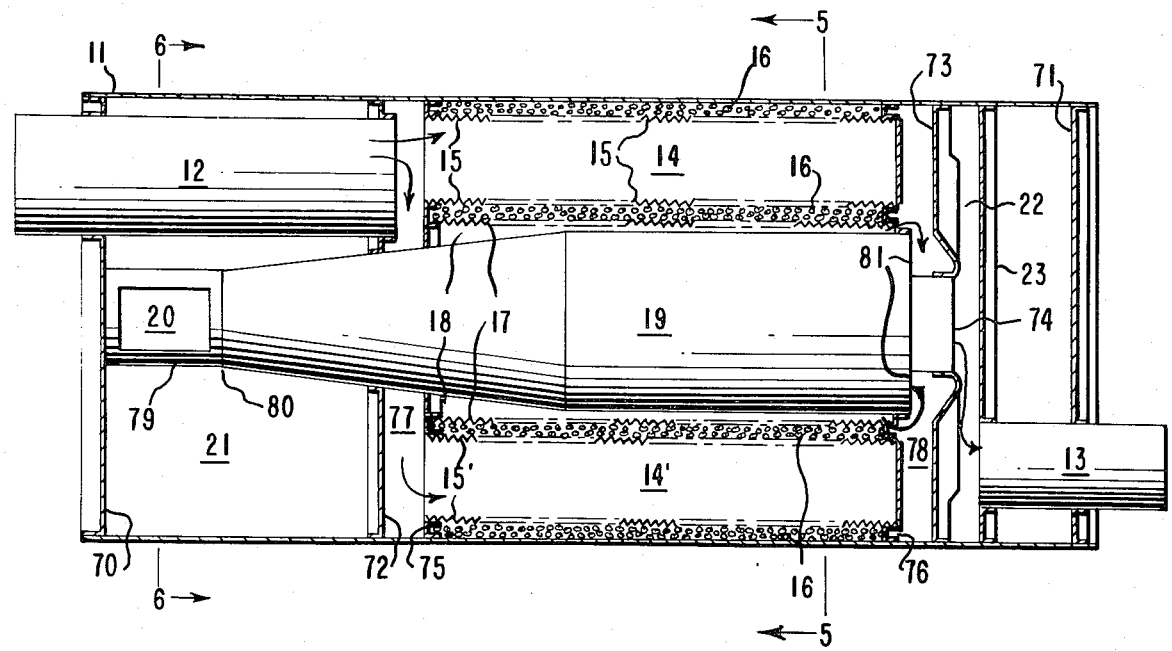
FIG. 4 represents another embodiment of the invention wherein the muffler particulate trap has one cyclone separator and two louvered guide tubes and a chamber of refractory alumina.
Figure 5:
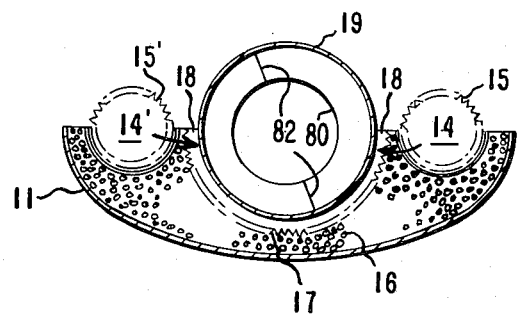
FIG. 5 is a cross-sectional view of the muffler particulate trap shown in FIG. 4 through 5—5.
Figure 6:
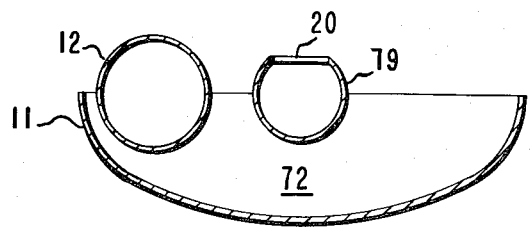
FIG. 6 is another cross-sectional view of the muffler particulate trap of FIG. 4 through 6—6.

In FIG. 4, the muffler particulate trap comprises housing 11 with trap inlet 12 and trap outlet 13 supported by ends 70 and 71, respectively. Baffle 72 supports cyclone 19 and inlet 12. Baffle 73 supports cyclone 19 by means of cyclone outlet 74. Outlet 74 is a cylindrical tube extending into cyclone 19 and held centered in the cyclone by helical vanes 82 united around outlet 74 and inside cyclone 19. Spaces between helical vanes 82 provide communication between the interior of cyclone 19 and chamber 78 through inlet space 81.

Each of guide tubes 14 and 14' communicates at one end with inlet 12 through plenum chamber 77 and is closed at its other end. Tubes 14 and 14' have louvers 15 and 15' in their peripheries. Tube 18 encircles and provides an annular space around cyclone 19, has louvers 17 in its periphery, has a closed end by plenum 77 and is open through space 81 at its chamber 78 end to communication with the helical vanes. Baffles 75 and 76 support tubes 14, 14' and 18. The annular space around cyclone 19 has its baffle 75 end closed, its baffle 76 end open. Bed 16 of agglomerating material fills space bounded by housing 11, baffles 75 and 76 and tubes 14, 14' and 18. Baffle 23 supports an end of outlet 13 in communication with outlet 74 through plenum chamber 22. The chamber between end 71 and baffle 23 is a resonating chamber to deaden sound. Extension 79 is attached to cyclone 19 at solids discharge opening 80. Extension 79 provides communication between extension opening 20 and opening 80 in the end of cyclone 19. Collection chamber 21 is closed except for opening 20.

The trap of FIG. 1 functions as follows. Exhaust gas from an internal combustion engine or any exhaust gas treating device (neither shown) which does not remove solids enters the trap through inlet 2 and passes through plenum 69 and wall 6 into agglomerating bed 4. In passing through bed 4, the particulate forming material in the exhaust gas is converted by condensation, particle nucleation and agglomeration to cyclone-separable particles. The exhaust gas bearing these particles then passes through wall 6' and into cyclones 7 and 7' through inlets 7i and 7i'. In the manner normal to cyclones, the exhaust gas spirals in cyclones 7 and 7' toward chambers 8 and 8' where solids are discharged by centrifugal force and the exhaust gas then spirals back and out through outlets 67 and 67'. Thereafter the gas discharges via chamber 10 through outlet 3 and has a lower solids content than it had at entry into inlet 2.

The trap of FIG. 4 functions in the following manner. Exhaust gas entering through inlet 12 passes via chamber 77 into tubes 14 and 14' and then through louvers 15 and 15' into agglomerating bed 16. Thereafter, gas passes through agglomerating bed 16 and carries agglomerated particles through louvers 17 into the annular space around cyclone 19 form which it passes, via chamber 78, through space 81 in the end of cyclone 19 between helical vanes 82 surrounding outlet 74. The helical vanes therein impart a spiral motion to the gas as it spirals toward opening 20. Solids are discharged through opening 20 into chamber 21 and the spiralling gas flows back and out outlet 74. From there, via chamber 22, the exhaust gas is discharged through outlet 13.

Figure 7:
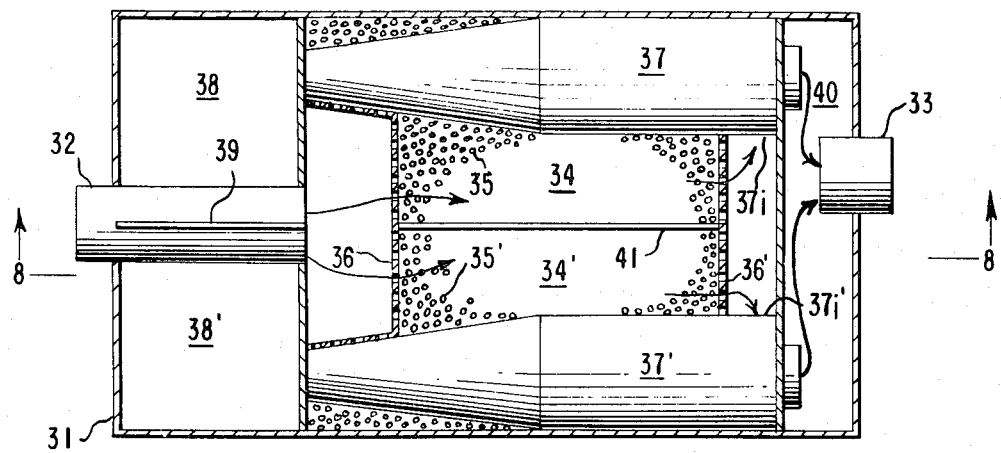
FIG. 7 represents an embodiment of the invention wherein the muffler particulate trap contains two chambers filled with refractory alumina and two cyclone separators.
Figure 8:
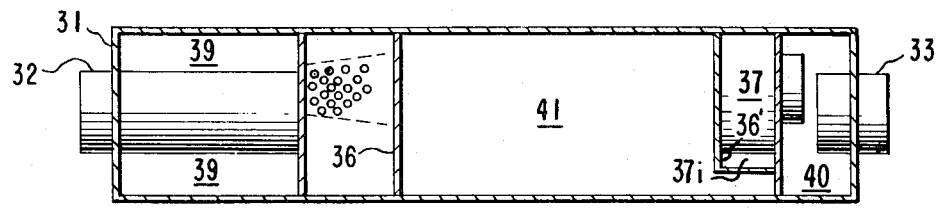
FIG. 8 is a cross-sectional view of the muffler particulate trap shown in FIG. 7 but without the alumina.

In FIG. 7, the muffler particulate trap comprises housing 31 with inlet port 32 and outlet port 33. Within housing 31, chambers 34 and 34' are filled with refractory alumina pellets 35 and 35' of high surface area. Chambers 34 and 34' are separated by partition 41 between them and are in communication with inlet port 32 so that exhaust gas entering the trap through inlet port 32 enters chambers 34 and 34' directly through perforated or sievelike retaining wall 36. Exhaust gases from an internal combustion engine (not shown) entering the muffler particulate trap through inlet 32 are conducted via tortuous paths through chambers 34 and 34' and thence through perforated or sievelike wall 36', through cyclone inlets 37i and 37i' into cyclone separators 37 and 37' wherein the particles are separated from the gases. The precipitated particles are collected and retained in collection chambers 38 and 38' separated by partition 39. The gases exiting from cyclone separators 37 and 37' flow into plenum chamber 40 and exit through outlet 33.

Figure 9:
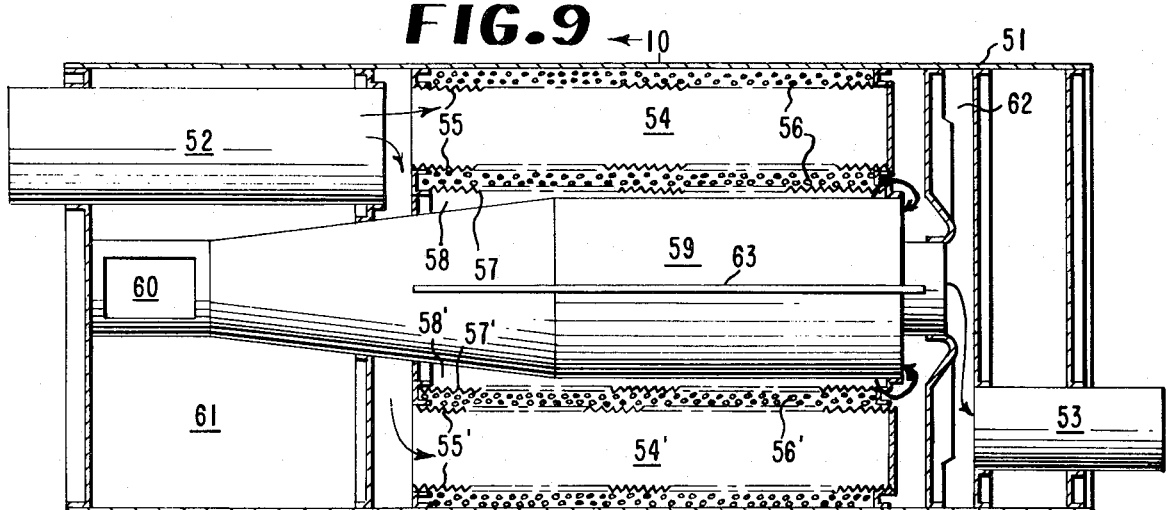
FIG. 9 represents another embodiment of the invention wherein the muffler particulate trap has two chambers filled with refractory alumina, two louvered guide tubes and one cyclone separator.
Figure 10:
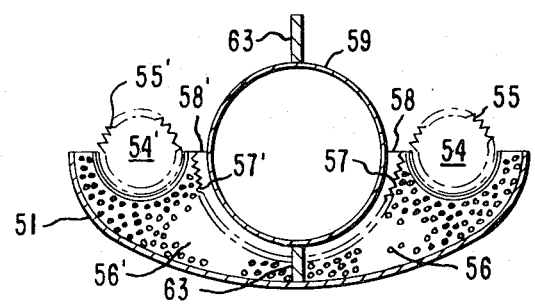
FIG. 10 is a cross-sectional view of the muffler trap shown in FIG. 9.

In FIG. 9, the muffler particulate trap has housing 51 with inlet port 52 and outlet port 53. Within housing 51 are two louvered guide tubes 54 and 54'. Cyclone separator 59 is mounted in housing 51 and has partition 63 extending from it to separate beds 56 and 56' of refractory alumina from each other thus forming two chambers. Exhaust gases entering through inlet port 52 are conducted into tubes 54 and 54' and thence through louvers 55 and 55' into beds 56 and 56' of refractory material. The exhaust gases then pass through louvers 57 and 57' into tubes 58 and 58' and then into cyclone separator 59. The particulates separated from the gases in cyclone separator 59 are deposited through opening 60 into collection chamber 61 where they are retained. The gases exiting from cyclone separator 59 flow into plenum chamber 62 and thence into the atmosphere through outlet 53.

While the present invention does not depend upon any particular theory for operation it is believed that the high surface area and the porosity of the alumina provide nucleation and/or agglomeration sites such that vapors of lead-containing compounds (lead halides) are condensed and the particulate lead compounds increase in size such that the particulate lead materials exiting the refractory alumina chamber(s) have particle sizes greater than those lead particles in an exhuast gas stream that is not contacted with said alumina.

In support of this hypothesis, it is found that the use of cyclone separators alone reduces lead particulate emission by about 70 percent relative to that emitted from an equivalent vehicle equipped with a conventional exhaust system whereas the use of the present invention muffler lead trap reduces the emission of lead particulates as much as 82 to 91 percent. Very importantly, a substantial reduction in the emission of submicron size lead particles, which are difficultly separated by cyclone separators alone, is obtained. Very little attrition of alumina occurs as evidenced by the retention of its size and shape after thousands of miles of operation (at least 50,000 miles) and the substantial absence of any alumina-derived material in the collected solids. The chemical composition of the lead salts is not altered in the muffler lead traps.

The exhaust gas stream, after leaving the bed(s) of alumina, enters the cyclone separator(s), rejects suspended particulate matter and exits from the separator(s). A cyclone separator normally comprises an extended closed circular shell having a gas inlet at a first end adapted to impart a spiral motion to gas introduced into the shell, a gas outlet pipe at the first end coaxial with and extending into the shell to a point past the gas inlet, and a particulate solids opening at the second end past the point to which the gas outlet pipe extends into the shell. The cyclone separates dispersed solids from a gas stream by imparting a spiral flow to the gas stream introduced into the shell through the gas inlet which is normally of the tangential or helical type. The solids in the spirally flowing gas stream are separated centrifugally and the gas stream exits through the gas outlet pipe.

Such cyclone separators having one or more tangential inlets are described on pages 305 to 309 in Fluid and Particle Mechanics, by C. E. Lapple, University of Delaware (1951). Cyclones having helical vane inlets are disclosed on page 466 of Chemical Engineering Practice, Cremer and Davies, Academic Press, Inc., New York (1957).

Conventionally, cyclone separators can remove about 90% of particles 5 microns or larger but their efficiency falls off rapidly with smaller particles, particularly sub-micron sizes. The removal efficiency is also reduced when the gas stream deviates from steady state and particularly when the gas stream is a pulsating one. The agglomerating effect of refractory oxides in the trap improves the efficiency of particle removal by making particles larger.

The collection chamber wherein the particulate matter separated from the gas stream in cyclone separators is collected and retained is of such size that sufficient volume is provided for the collection of solids produced in any given usage. The average amount of particulate lead matter emitted depends upon the lead content of the fuel used, percent of lead burned which is emitted and on the mode of operation of the vehicle. For a muffler lead trap to be useful for 50,000 miles of operation using fuel containing about 2.2 g. lead per gallon, the collection chamber will have sufficient volume to retain about 15 lbs. (6.8 kg.) of lead particulates. Likewise, a muffler lead trap designed for 100,000 miles of operation will have sufficient volume to retain at least 30 lbs. (13.6 kg.) of lead particulates.

The present invention muffler lead trap can be fabricated using the technology now available for the manufacture of conventional mufflers. Such technology covers stamping, folding, bending, crimping and the like. The refractory alumina pellets are added to the chamber(s) before final assembly of the muffler lead trap. The material of construction can be aluminized steel or stainless steel. It is preferred that the chambers enclosing the refractory alumina and the cyclone separators be constructed of stainless steel e.g. Type 409 stainless steel for better resistance to corrosion and high temperatures. If desired, the total system including the housing can be of stainless steel, particularly where the muffler lead traps are designed to last at least 100,000 miles of operation.

In measuring the effectiveness of the invention muffler lead traps, the following determinations of lead particulates were carried out.

1. Total lead is determined according to the method of Habibi (Environmental Science and Technology 4, 239-348 (1970)) with a total exhaust filter attached to the vehicle tail pipe, while the car was operated on a programmed chassis dynamometer (PCD) according to the Federal Mileage Accumulation Schedule (modified AMA) (U.S. Department of Health, Education, and Welfare, Part II "Control of Air Pollution from Motor Vehicles and New Motor Vehicle Engines" Federal Register 33, No. 2 (1968)). The total exhaust filter which mounts directly on the tail pipe of a car is a cylindrical drum 18 inches in diameter, 24 inches long and packed with high efficiency filter-glass medium. The total vehicle exhaust flows through the filter which is designed to give a low pressure drop across the filter - less than 2 inches of water at 70 miles per hour cruise. The pressure drop across the filter increases with the accumulation of material on the filter. In practice the filters are removed when the pressure drop exceeds about six inches of water.

After each test, the filter unit is disassembled and the lead on the filter medium is extracted with hydrochloric acid. The lead deposited on the inlet pipe and internal parts of the holder is extracted with an aqueous solution of the tetrasodium salt of ethylenediamine tetraacetic acid. These solutions are analyzed for lead by atomic absorption.

2. Lead particle size distribution is determined by using the exhaust particulate sampling system developed by Habibi (reference cited above). In this procedure, total exhaust gas from a vehicle operating on the PCD is introduced into a duct 22 inches in diameter and 40 ft. long. The exhaust is diluted with filtered ambient air using the constant volume proportional sampling principle. Two impactor units are used simultaneously to provide a wide size distribution measurement of exhaust lead particles over the range of 0.3 to 9 microns equivalent diameter. Particles smaller than 0.3 micron equivalent diameter are collected on an absolute filter downstream of each impactor unit.

3. Airborne lead is determined by measuring the amount of lead particles remaining suspended in the air in a sealed formerly used turnpike tunnel after driving the vehicles back and forth on the tunnel roadway. For the test a car is started cold after a 16-hour soak period and manually driven back and forth over a fixed course (one way distance of 4450 ft.) for a total of 24 7 mode Federal Test cycles with the aid of an audiotape prompter. An absolute filter sampler mounted on the roof of the test car collects a spatially integrated sample of airborne tunnel particulates over the driving course during each driving period. Prior to conducting the test, the car is conditioned by driving a total of 50 7 mode Federal Test cycles on the road. The turnpike tunnel is conditioned by flushing the tunnel with clean ambient air for about one hour, prior to each test or for such time as required to lower the tunnel carbon monoxide concentration and light scattering coefficient to the same level as the outside air.

The efficacy of the invention muffler lead trap in removing lead particulates from the exhaust stream is demonstrated in standard production automobiles by replacing the standard muffler with the muffler lead trap. The muffler lead trap is constructed substantially as shown in FIG. 1 and is sized and shaped like the standard muffler it replaced. The unit incorporates a bed of high surface area alumina in the form of ¼ inch pellets followed by two cyclone separators in parallel. The muffler lead trap weighs about 17 pounds without pellets which is approximately the same weight as the standard muffler and is filled with 10 pounds of alumina pellets. The alumina pellets used had following typical chemical analyses: 0.02% $SiO_2$; 0.02% $Fe_2O_3$; 0.002% $TiO_2$; 0.30% $Na_2O$; 6.0% loss on ignition and 93.6% $Al_2O_3$. This corresponded to a maximum of 0.27 moles $H_2O$ per mole of $Al_2O_3$. Physically, the typical properties were: surface area, 380 sq. meters/g; pore volume 0.51 cc/g; pore diameter 50 Angstroms; bulk density 47–48 lb/cu. ft; abrasion loss 0.2% and crushing strength 50 lbs force.

Four automobiles (1970, 350 CID Chevrolets) are equipped with the invention muffler lead traps and are operated on PCD under the Federal Mileage Accumulation Schedule up to 50,000 miles. During the mileage accumulation, the total lead emission rate for each car is measured according to the method indicated above. The average total lead emission rate and the average percent of lead emitted for each car are shown in the following Table. The gasoline used in the tests contained 2.2 g. lead per gallon.

TABLE 1

| Vehicle | Miles on Muffler Lead Trap | Average Total Lead Emitted g/mile | % lead Burned |
|---|---|---|---|
| A | 52,669 | 0.014 | 10.7 |
| B | 27,418 | 0.018 | 14.0 |
| C | 50,102 | 0.014 | 11.7 |
| D | 12,440 | 0.012 | 8.7 |
| Weighted Means | | 0.015 | 11.3 |
| Standard Car (no trap) | 30,000 | 0.12 | |
| Percent Reduction Due to Muffler Lead Trap | | 88 | |

Table 1 shows that the average total lead emission rate for automobiles equipped with the muffler lead traps (A, B, C and D) is 0.015 gram per mile. This emission rate is equivalent to a reduction in lead emission of 88%.

In addition to reducing the total lead emission, the invention muffler lead traps also reduced the amount of small, air-suspendable lead particles emitted to the atmosphere. Air-suspendable lead particles generally have mean diameters of less than about 1 micron. Particle size and size distribution of the lead particles emitted from the muffler lead trap equipped automobile measured after 15,000 miles of operation are shown in the following Table. The data for each vehicle are an average of three different measurements.

The durability of the invention muffler lead trap is excellent. Several of the muffler lead traps were opened and examined after 25,000 miles of operation. The alumina pellets showed little or no attrition. The pellet bed was not plugged and the bed back-pressure had not increased over the original value. Since the muffler lead traps are designed to have back pressure similar to those of the standard mufflers, the fuel economy and the overall performance of the vehicle are substantially the same with the invention exhaust system or with the conventional exhaust system. The noise attenuation with the muffler lead trap is also about the same as that of the conventional muffler.

The invention muffler lead trap was also installed on a vehicle equipped with a lead-tolerant emission control system. For the lead-tolerant emission control system, an exhaust manifold thermal reactor is used in conjunction with an air pump to provide a high temperature zone where the hydrocarbons and carbon monoxide in the exhaust are oxidized. An exhaust gas recirculation system is combined with carburetor modifications to control the emissions of oxides of nitrogen. A muffler lead trap which is of the same size and shape as the standard muffler is installed on a 1.6 liter 1971 Pinto automobile in the same location as the original muffler. The muffler lead trap is constructed substantially as shown in FIG. 1 incorporating a bed of high surface area alumina pellets described above, followed by two cyclone separators in parallel.

Total lead emission rates and particle size distributions of the emitted lead particles from the vehicle equipped with a standard muffler and the vehicle equipped with the invention muffler lead trap are sum-

TABLE 2

| | Lead Emission Rate (g./mile) 350 CID Engines | | | | |
|---|---|---|---|---|---|
| Particle Size (μm.) | > 9 | 1–9 | < 1.0 | < 0.3 | Total* |
| Vehicle | | | | | |
| Standard (no trap) | 0.038 | 0.023 | 0.047 | 0.028 | 0.108 |
| A | 0.00084 | 0.0025 | 0.017 | 0.015 | 0.020 |
| B | 0.00057 | 0.0030 | 0.015 | 0.011 | 0.018 |
| C | 0.00074 | 0.0021 | 0.013 | 0.011 | 0.016 |
| Average of A, B and C | 0.00074 | 0.0025 | 0.015 | 0.012 | 0.018 |
| % Reduction Due to Muffler Lead Trap | 98 | 89 | 68 | 59 | 84 |

*The "Total" column gives the sum of particle amounts under headings ">9", "1–9" and "<1.0".

Table 2 shows that particles of large size are almost completely removed. Of special significance is the fact that the sub-micron size particles are also removed to the extent of 68%. As is known, the reduction in the emission of these sub-micron particles is of great importance since these are the particles which tend to remain airborne and remain in the atmosphere whereas larger size particles settle to the ground very rapidly.

marized in Table 3. The data are averages of three replicate runs. The mileage on the standard vehicle was about 22,000 miles while that of the muffler lead trap equipped vehicle was about 29,000 miles. In each test, gasoline containing 2.2 g. lead per gallon was used.

TABLE 3

| | Muffler Lead Trap Performance 1.6 Liter Pinto Emission Control Equipped g./mile | | | | |
|---|---|---|---|---|---|
| Particle Size (μm.) | > 9 | 1–9 | 0.3–1 | < 0.3 | Total* |
| Vehicle | | | | | |
| Standard (no trap) | 0.013 | 0.018 | 0.015 | 0.051 | 0.097 |
| Muffler Lead Trap | 0.00025 | 0.0013 | 0.0017 | 0.0091 | 0.012 |
| % Reduction Due to Muffler Lead Trap | 98 | 93 | 89 | 82 | 88 |

*The "Total" column gives the sum of particle amounts under headings ">9", "1–9", "0.3–1" and "<0.3".

The above results show that the average total lead emission rate is reduced by 88% by the use of the muffler lead trap. The data also show that the muffler lead trap is effective in reducing emission of particles of all sizes. Lead particles with size greater than nine microns are reduced by 98%. There is a 93% reduction of the 1 to 9 micron fraction, an 89% reduction of the 0.3 to 1 micron particles and an 82% reduction in the particles of less than 0.3 micron. These results clearly establish the effectiveness of the invention muffler lead trap in reducing emission of large and small lead particles over extended mileages. The above muffler lead trap equipped vehicle at 50,000 miles continued to reduce average total lead emission by greater than 85%. The sound attenuation with the muffler lead trap was about the same as that of the standard muffler.

While in the above description, the muffler lead trap was used in conjunction with an exhaust manifold thermoreactor which reduced the hydrocarbon, carbon monoxide and oxides of nitrogen content of the exhaust gas, it is clear that the invention muffler lead trap may also be used with any other lead-tolerant emission control system such as catalytic devices.

To demonstrate that the reduction in lead particle emission as measured in the laboratory is attended by a corresponding reduction in airborne lead, Vehicle A (with muffler lead trap) described above was used in a turnpike tunnel for the determination of air-suspendable lead emission rate. Table 4 summarizes the results obtained.

TABLE 4

| Vehicle | No. of Cars | No. of Tests | Average Airborne Lead Collected μg. | % Reduction in Airborne Lead |
|---|---|---|---|---|
| Standard (no trap) | 4 | 13 | 101 | — |
| Vehicle A | 1 | 3 | 16 | 84 |

The above results clearly show that the muffler lead trap of the invention greatly reduces the emission of small particle size lead particles which are air suspendable and which therefore tend to become and remain airborne.

The embodiments of the invention in which an exclusive property or privilege is claimed are defined as follows:

1. An exhaust muffler particulate trap for attenuating the sound and removing solid particles from the exhaust of an internal combustion engine that is operated on fuel containing tetraalkyllead compounds and lead-scavenging compounds, said trap comprising
   i. an elongated housing having an inlet port at one end for connection with the exhaust gas stream of said engine, and an outlet port at the other end communicating with the atmosphere, said housing also having an agglomerating chamber and an inertial cyclone separator communicating with a particulate collection chamber, said agglomerating chamber, cyclone separator and collection chamber being located within said housing, said agglomerating chamber being in communication with said inlet port through a plenum located between the collection chamber and the agglomerating chamber, said collection chamber located at the inlet port end of the housing;
   ii. said agglomerating chamber containing refractory alumina pellets having a pore volume in the range of 0.1 to 0.9 cc per gram and a surface area in the range of 50 to 700 square meters per gram, said alumina being nonreactive with the exhaust gas constituents;
   iii. said cyclone separator having an inlet, a particulate outlet and a gas outlet, and being in communication with said agglomerating chamber through the cyclone separator inlet, the cyclone separator also communicating with said particulate collection chamber wherein particulates are collected and retained, communication with the collection chamber being through the particulate outlet of the cyclone separator, the cyclone separator also being in communication with the outlet port of the housing through the cyclone separator gas outlet.

2. An exhaust muffler particulate trap according to claim 1 having two cyclone separators, each in direct communication with the agglomerating chamber and each in communication with a separate collection chamber.

3. An exhaust muffler particulate trap according to claim 1 having two agglomerating chambers.

4. An exhaust muffler particulate trap according to claim 3 having two cyclone separators, each in direct communication with an agglomerating chamber, and each cyclone separator also in communication with a separate collection chamber.

* * * * *